United States Patent [19]

Thacker et al.

[11] Patent Number: 5,179,558
[45] Date of Patent: Jan. 12, 1993

[54] ROUTING APPARATUS AND METHOD FOR HIGH-SPEED MESH CONNECTED LOCAL AREA NETWORK

[75] Inventors: Charles P. Thacker; Lawrence C. Stewart, both of Santa Clara County, Calif.

[73] Assignee: Digital Equipment Corporation, Maynard, Mass.

[21] Appl. No.: 746,796

[22] Filed: Aug. 12, 1991

Related U.S. Application Data

[63] Continuation of Ser. No. 370,248, Jun. 22, 1989, abandoned.

[51] Int. Cl.$^5$ .......................... H04J 3/24; H04Q 11/04
[52] U.S. Cl. ................................. 370/94.3; 370/94.1; 370/60; 340/825.02; 395/425
[58] Field of Search ............... 395/117, 650, 375, 200, 395/425, 400; 379/67, 221; 370/94.1, 60, 85.13, 94.3, 60.1, 58.1, 58.2, 58.3, 13, 16, 85.1, 85.9, 85.6; 340/825.02, 825.5, 825.51, 825.52; 371/11.1, 11.2, 11.3

[56] References Cited

U.S. PATENT DOCUMENTS

| | | | |
|---|---|---|---|
| 3,916,380 | 10/1975 | Fletcher et al. | 340/825.04 |
| 4,271,506 | 6/1981 | Broc et al. | 370/85.2 |
| 4,439,826 | 3/1984 | Lawrence et al. | 395/575 |
| 4,525,806 | 6/1985 | Barnes et al. | 395/117 |
| 4,550,402 | 10/1985 | Gable et al. | 370/94.1 |
| 4,556,972 | 12/1985 | Chan et al. | 370/60 |
| 4,598,400 | 7/1986 | Hills | 370/60 |
| 4,603,416 | 7/1986 | Servel et al. | 370/94.1 |
| 4,630,260 | 12/1986 | Toy et al. | 370/94.1 |
| 4,651,318 | 3/1987 | Luderer | 370/60 |
| 4,663,620 | 5/1987 | Paul et al. | 340/825.5 |
| 4,670,871 | 6/1987 | Vaidya | 370/60 |
| 4,679,189 | 7/1987 | Olson et al. | 370/60 |
| 4,696,000 | 9/1987 | Payne, III | 370/60 |
| 4,698,803 | 10/1987 | Haselton et al. | 370/60 |
| 4,736,363 | 4/1988 | Aubin et al. | 370/60 |
| 4,740,954 | 4/1988 | Cotton et al. | 370/60 |
| 4,754,451 | 6/1988 | Eng et al. | 370/60 |
| 4,754,479 | 6/1988 | Bicknell et al. | 379/221 |
| 4,847,755 | 7/1989 | Morrison et al. | 395/650 |
| 4,866,702 | 9/1989 | Shimizu et al. | 370/94.3 |
| 4,937,817 | 6/1990 | Lin | 370/94.1 |
| 4,947,390 | 8/1990 | Sheeny | 370/85.13 |
| 4,996,704 | 2/1991 | Brunson | 379/67 |
| 5,021,945 | 6/1991 | Morrison et al. | 395/375 |
| 5,088,091 | 2/1992 | Schroeder et al. | 370/85.13 |
| 5,113,496 | 5/1992 | McCalley et al. | 395/200 |
| 5,115,499 | 5/1992 | Stiffler et al. | 395/425 |

Primary Examiner—Douglas W. Olms
Assistant Examiner—Dang Ton
Attorney, Agent, or Firm—Flehr, Hohbach, Test, Albritton & Herbert

[57] ABSTRACT

A packet routing apparatus allows numerous packets to be routed simultaneously through a mesh connected network. The network consists of a number of interconnected switches which are coupled, in turn, to the hosts that are members of the local network. The switches are nonblocking switches that are coupled to each other and to the hosts by a multiplicity of point to point links. Each switch has a routing mechanism for automatically routing received packets toward their specified destinations. For each received packet the router generates a routing mask representing the output links that may be used to route the packet towards its destination. The routing mask includes a broadcast bit. If the broadcast bit is ON, the packet must be simultaneously routed to all of the output links specified by the routing mask. If the broadcast bit is OFF, the packet may be routed on any single one of the links specified by the routing mask. To ensure that every packet makes progress towards its destination, packets are processed in the order of their arrival by placing the corresponding routing masks in a queue. Periodically, the set of available output links is compared with all of the routing masks. Using a first come, first considered routing discipline, the first routing mask in the queue to match the available output lines is selected. A routing selection is then generated for the corresponding packet and the selected routing mask is removed from the queue.

12 Claims, 10 Drawing Sheets

ROUTING APPARATUS AND METHOD FOR HIGH-SPEED MESH CONNECTED LOCAL AREA NETWORK

This is a continuation of application Ser. No. 07/370,248 filed Jun. 22, 1989 now abandoned.

This patent application is related to patent application Ser. No. 07/370,285 now U.S. Pat. No. 5,088,091, filed simultaneously herewith, entitled HIGH-SPEED MESH CONNECTED LOCAL AREA NETWORK, which is hereby incorporated by reference.

The present invention relates generally to computer communications networks for interconnecting computers and particularly to a routing apparatus and method for mesh connected local area networks.

BACKGROUND OF THE INVENTION

Local area networks (LANs) are commonly used to transmit messages between relatively closely located computers. There are at least three basic types of organizational architectures for LANs: linear, ring and mesh. Ethernet, for example, is a widely used linear LAN for interconnecting computer workstations, mainframes, and minicomputers. The present invention concerns only mesh connected LANs.

Traditionally, while mesh connected LANs have been discussed in computer science literature and a few patents, mesh connected LANs have never achieved commercial success due to several well known and relatively intractable problems. One of those problems has been the lack of an efficient mechanism for routing messages through a mesh connected network. Ideally, the routing mechanism should be able to quickly route each packet received by a switch to a path that will bring the packet closer to its destination. The routing mechanism should also take advantage of the numerous pathways in a mesh connected network so that the network throughput exceeds the throughput of a single link.

Referring to FIG. 1, each switch S in the network 100 can receive data packets from several different input links, each of which must be routed to one or more output links. The switch must therefore have a mechanism for selecting a correct output link for each packet. To achieve high throughput, the network must use nonblocking switches which can simultaneously route many packets from various input links to different output links. In addition, it would preferable for the switch to allocate available output links to data packets fairly and yet quickly. A fair routing method is generally one which gives routing priority based on the order in which packets have been received.

SUMMARY OF THE INVENTION

In summary, the present invention is a packet routing apparatus for use in a high-speed mesh connected local area network. The mesh connected network consists of a number of interconnected switches which are coupled, in turn, to the host computers that are members of the local area network. The switches are nonblocking switches that are coupled to each other and to the hosts by a multiplicity of point to point links.

Each switch has a routing mechanism for automatically routing a received message packet toward its target host. In particular, the routing mechanism of the present invention allows numerous packets to be routed simultaneously through the network. For each received packet, the router first generates a routing mask representing the output links that could be used to retransmit the packet—i.e., route it towards its destination. The routing mask includes a broadcast bit. If the broadcast bit is ON, the packet must be simultaneously routed to all of the output links specified by the routing mask. If the broadcast bit is OFF, the packet may be routed on any one of the links specified by the routing mask.

Periodically, the set of available output links is compared with all of the routing masks for packets that are waiting to be routed. To ensure that every packet makes progress towards its destination, packets are processed in the order of their arrival by placing the corresponding routing masks in a queue. Using a "first come, first considered" routing discipline, the first routing mask in the queue to match the available output lines is selected. A routing selection is then generated for the corresponding packet and the selected routing mask is removed from the queue.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
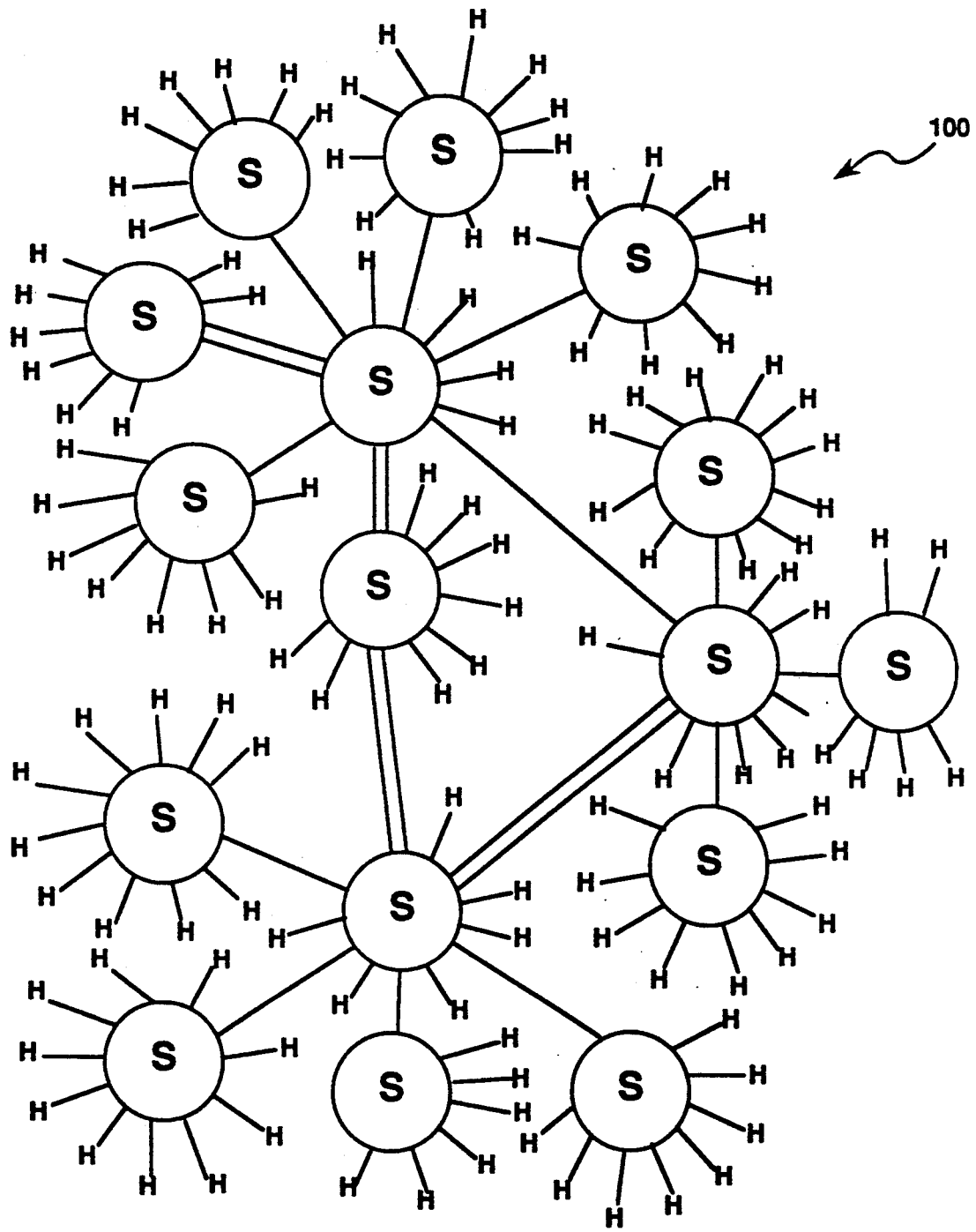
FIG. 1 is a block diagram of a small mesh connected network in accordance with the present invention.

FIG. 1 shows a conceptual representation of a mesh connected local area network 100 in accordance with the present invention. Unlike the prior art mesh networks, there is no particular hierarchy of nodes and no requirements as to how the nodes of the network are interconnected. The nodes of the network could be randomly interconnected and the network would still function properly, although a well thought out set of interconnections will provide somewhat better performance. Host computers which use the network are labelled H, and the nodes which comprise the local area network (LAN) are called switches and are labelled S. In this conceptual diagram sixteen switches are used to interconnect about eighty hosts. The switches S are multiported, cut-through nonblocking switches which can simultaneously couple a multiplicity of incoming links to various selected outgoing links. These switches enable numerous data packets to be simultaneously routed through the network.

Nonblocking Switch

Figure 2:
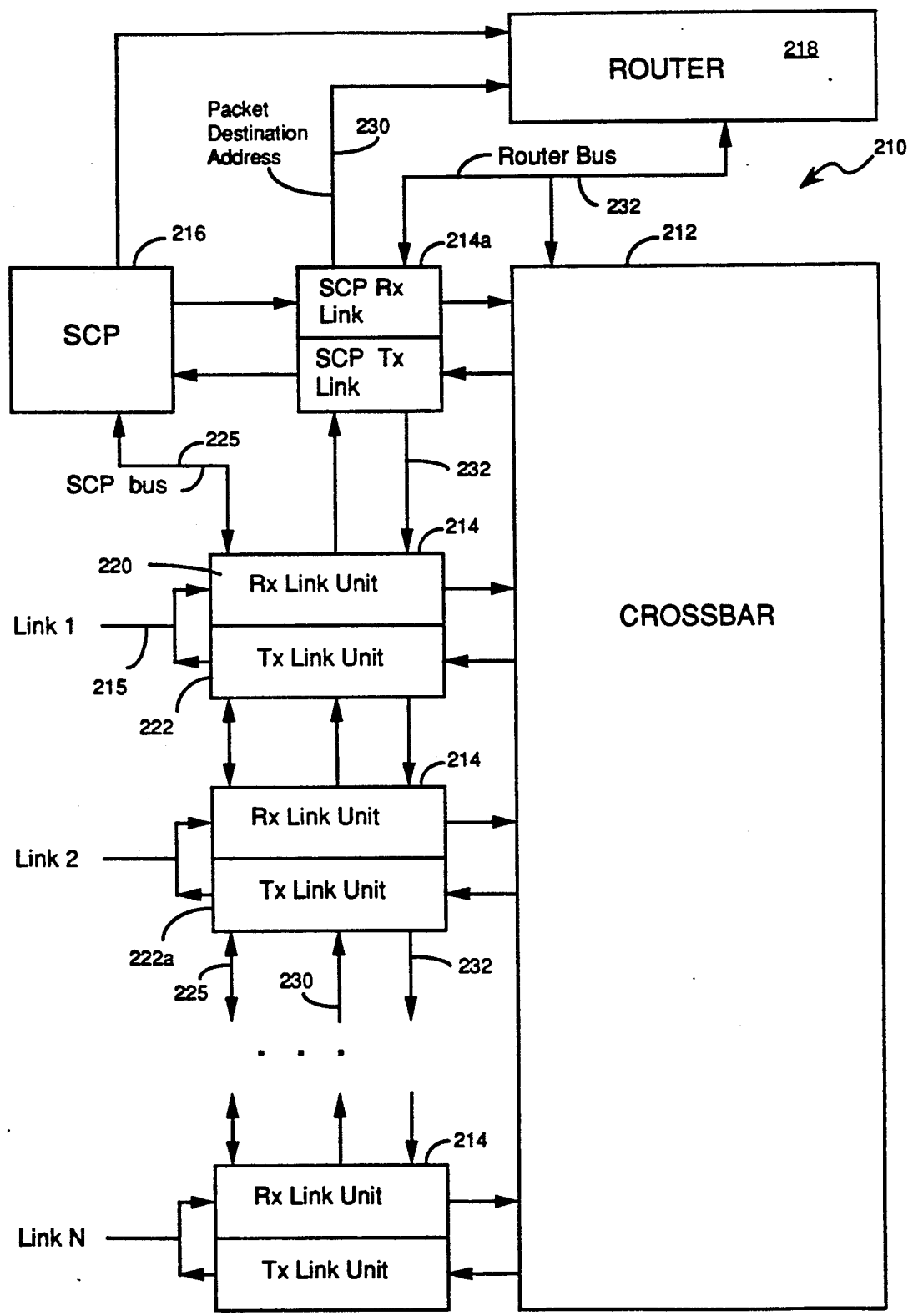
FIG. 2 is a block diagram of the switch used in the preferred embodiment.

Referring to the block diagram in FIG. 2, the primary components of each switch 210 are a nonblocking crossbar switch 212, a number of switch ports 214 (twelve in the preferred embodiment) which are also called link control units 214, a switch control processor (SCP) 216, and a router 218 which is also called the routing logic circuit 218. There is also a special link circuit 214a for coupling a microprocessor 216 called the switch control processor to the crossbar 212.

Link unit 214a couples the switch control processor (SCP) 216 to the crossbar so that the SCP 216 can send and received data packets via the crossbar 212 using the same communication mechanisms as the host computers in the network.

Each link unit 214 couples the crossbar 212 to one full duplex link 215. Each link 215 has two data channels so that data can be simultaneously transmitted in both directions over the link 215. Therefore each link unit 214 has two components: an input link unit 220 (Rx) and an output link unit 222 (Tx).

When a new data packet is received by the switch 210, the input link unit 220 which receives the data packet is coupled by the crossbar 212 to the output link unit 222a (for a different link than the input link). The output link unit 222a retransmits the received data packet over another link, and thereby forwards the packet towards its destination. The crossbar 212 can simultaneously couple every one of the input link units 220 to a distinct output link unit 222a. For that reason the switch 210 is called a nonblocking switch.

The purpose of the router 218 is to determine which output link unit 222 should be coupled to each input link unit 220. When a new data packet is received by an input link unit 220, the input link unit 220 sends a routing request to the router 218. The routing request specifies the destination of the packet, as well as the identity of the input link unit. As shown, the link unit 220 sends the packet's destination address to the router 218 over bus 230.

It is noted that the destination address of the packet is obtained from the first few bytes at the beginning of each packet. The destination address specifies the network member to which the packet is being sent.

The Router Bus 232 includes a link mask with one bit corresponding to each of the link units, plus a four bit link index, a broadcast bit and a valid flag. Each of the lines of the link mask portion of bus 232 can be thought of as a single bit communication line between the router 218 and one of the link units 214.

An availability flag is periodically sent by each output link unit 222 to the router 218. The availability flag is ON when the output link is not busy and is "not blocked" and is therefore available for routing a new data packet. An output link unit is blocked when the switch on the other end of the link (i.e., the link coupled to the output link) unit has sent a Stop flow command. The Stop flow command indicates that the switch on the other side of the link is not ready to receive more data. When the output link unit 222 is busy or blocked, its availability mask is OFF. The thirteen availability mask bits from the output link units 222 are periodically sampled by the router 218 and then used to make a route selection.

Using the information sent by the input link unit 220, the router 218 determines which output link unit(s) 222 should be used to retransmit the data packet. The routing selection made by the router 218 is transmitted over the router bus 232 to the link units 214 and crossbar 212 which use the routing selection to set up the specified connections.

Connections between input link units 220 and output link units are made by the crossbar 212 as follows. Generally, each time that the router 218 issues a new link selection, two multiplexers inside the crossbar will be set so that a selected input link unit is coupled to a selected output link unit. Two multiplexers are needed because one transmits data from the input link unit to the output link unit, while the other multiplexer transmits flow control signals back to the input link unit. When broadcast packets are transmitted, the number of multiplexers set up by the link selection signals will depend on the number of output links being used. For more details, see patent application Ser. No. 07/370,285 now U.S. Pat. No. 5,088,091, previously incorporated by reference.

It is noted that while the initial preferred embodiment has only a dozen switch ports (i.e., link units) 214, it is anticipated that future units may have larger numbers of such ports.

The SCP 216 is a standard microprocessor (e.g., a 68010 microprocessor made by Motorola is used in the preferred embodiment) which is programmed to reload the router 218 whenever the switch 210 is powered up or reset, and to perform a reconfiguration program whenever a component of the network fails or a new component is added to the network. The SCP is also coupled to all the link units 214 by SCP bus 225 so that the SCP can monitor the status of the link units.

Router Circuit

Every switch in the network is assigned a unique seven-bit SHORT ID in addition to a 48-bit UID. SHORT IDs are assigned during configuration of the network and the SHORT ID for any particular switch may change when the network is reconfigured. Each host computer is assigned an eleven-bit "network address". The network address of a host computer is generated by concatenating the SHORT ID of its switch with the four-bit value of the link port which couples the host to the switch. The network address of each switch is its SHORT ID plus a predefined four-bit value (e.g., zero) corresponding the link number of the SCP link unit.

Network addresses are the address values used to specify the destinations of packets transmitted through the network.

The reason that each network member is assigned a network address as well as a UID is that a shorter value was needed to facilitate the routing of packets through the network. The seven-bit SHORT ID allows for up to 128 switches. Since each switch has at most twelve external ports, at least one of which must be used to connect the switch to another switch in the network, there can be at most 1408 hosts. This is expected to be more than sufficient for all anticipated applications of the present invention. Of course, the allowed number of network members could be doubled simply by using a 12-bit network address.

When a data packet is first transmitted, the network address of the network member to which the data packet is being sent is stored in the first few bytes of the packet. The router 218 uses the value of the network address, as well as the input link on which the packet is received, to determine which output link(s) should be used to retransmit a data packet.

Generally, the purpose of routing mechanism of the present invention is to allocate system resources (i.e., output links) on a fair and equitable basis to data packets. As will be described in more detail later, the present invention provides a first come, first considered routing priority wherein requests for resources are compared with the set of available resources in the order that the requests were received. The first request to match the available resources is selected and allocated the resources that it needs. Then the process repeats.

Using the first come, first considered routing discipline, a later request can be allocated resources before an earlier request as long as the allocation doesn't conflict with the needs of the earlier request. This routing discipline maximizes the rate at which available resources can be allocated to resource requesters. For broadcast data packets, this routing discipline means that requested resources are reserved by broadcast requests, thereby preventing later requests from impeding the progress of broadcast data packets.

Figure 3:
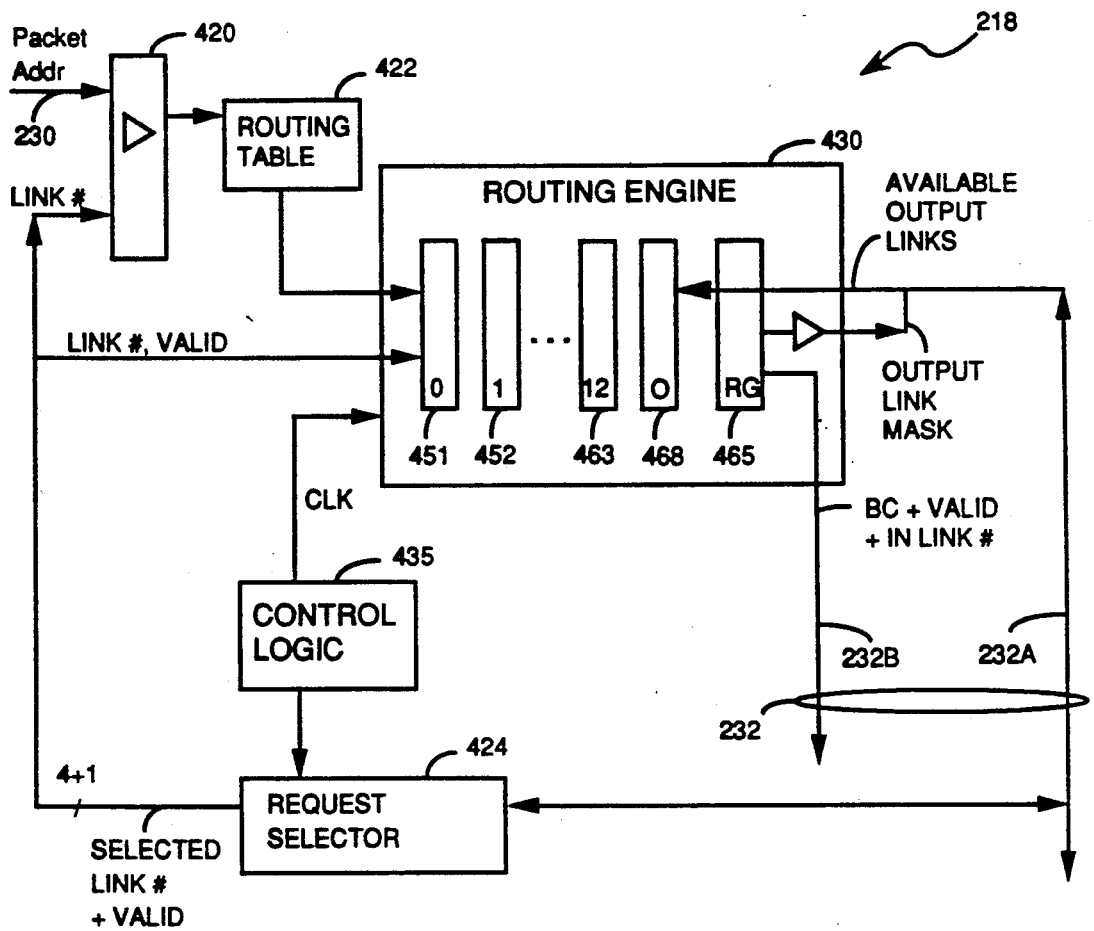
FIG. 3 is a block diagram of the router apparatus used in the switch of FIG. 2.

FIG. 3 shows the basic components of the router circuit 218 used in the preferred embodiment. As was shown in FIG. 2, the router 218 receives packet destination addresses on bus 230. Routing requests and output link availability signals are time-multiplexed on router bus 232 along with the transmission of link selection values by the router 218.

Each "routing address" includes an eleven-bit packet address and a four-bit input link number. The routing address is stored in a register 420. A routing table 422 is a look up table which is indexed by routing address values. The routing table 422 contains an entry, for every possible routing address value, which specifies the output links which could potentially be used for routing the packet that corresponds to the routing address.

Whenever an input link unit detects the receipt of a new packet at the output of its FIFO buffer, it sends a request signal in the link mask portion 232A of the router bus 232.

A routing request selector circuit 424 monitors bus 232A to see if any routing requests are being asserted. If one or more routing requests are asserted during any one routing engine cycle, the selector 424 selects one of the requests. The selected request is acknowledged by sending an ON signal on bus 232A to the selected link unit at an appropriate time. This acknowledgement signal instructs the signaled link unit that it has been selected to transmit its routing request over bus 230, and then the selected input link unit sends the packet destination address for its routing request to buffer 420 vis bus 230.

The request selector circuit 424 is a cyclic priority encoder, which bases the priority for selecting among competing requests on the last link unit whose request was selected. This ensures that all requests are accepted within a short period of time and helps to prevent packet starvation.

Each routing request includes an eleven-bit packet destination address received on line 230, and its associated four-bit input link number, which is provided by the request selector circuit 424. The routing table address is stored in a register 420 for use by a routing table 422. The routing table 422 is stored in a random access memory and the fifteen bit value in register 420 is used as the address for retrieving a value (called a routing mask) from the routing table 422. The selected routing mask output by the routing table 422 is latched in by the routing engine 430 at the beginning of the next routing engine cycle, as will be explained in more detail below.

Routing table 422 contains an entry for every possible routing request. In other words, it has an entry for every possible combination of an input link number with a packet destination address. Since these two values occupy fifteen bits, the number of entries in the table 422 will be $2^{15}$, or 32,768. Each entry occupies two bytes of storage, and therefore the table 422 requires 65,536 bytes of storage. Typically, only a small number of the entries in the routing table will represent "legal" routing requests, and all the others will represent corrupted or otherwise illegal request values. The table entry for illegal requests is all zeros, except for a "broadcast bit" which is set equal to "1". If a data packet generates an illegal routing request, the data packet is purged from the switch.

In a network with eighty network members there will be a total of only eighty-one or so legal packet addresses, including one address for each network member and one or more "broadcast" addresses for sending packets to all hosts on the network. Also some combinations of input link numbers and packet addresses will be illegal because they correspond to routes which take packets away from their destination or create possible deadlocks. Therefore, in a eighty member network the routing table 422 for any particular switch would be likely to have between 320 and 750 legal entries.

Each entry in the routing table 422 contains a routing mask. An example of a routing mask is:

| ROUTING TABLE ADDRESS | ROUTING MASK |
|---|---|
| Input Link, Packet Address | BC \| 0123456789ABC (Link#) |
| 0110  11001100110 | 0  0011100000000 |

Each address in the routing table represents one of the possible routing request values that can be received from an input link, and is therefore represented here by the concatenation of an input link number and a packet address.

The routing mask in each routing table entry contains thirteen mask bits, one for each of the output links of the switch including the SCP. Each mask bit which is ON (i.e., equal to "1") represents an output link which may be used to route the packet. The routing mask also contains a broadcast bit BC which indicates whether the packet address is a broadcast address or a normal address. An example of a routing mask is shown in FIG. 4, which also shows a valid bit above the routing mask and a link number below it for reasons that are explained below.

If the broadcast bit BC is ON (i.e., equal to "1"), the packet is called a broadcast packet. Broadcast packets must be simultaneously routed to all of the output links specified by the routing mask.

If the broadcast bit is OFF (i.e., equal to "0"), the packet is called a non-broadcast packet. For a non-broadcast packet the routing mask has a mask bit equal to "1" for each output link which could be used to route the packet toward its destination (i.e., the packet may be routed on any single one of the output links specified by the routing mask). In many instances, several different alternate output links can be used to route a packet toward its destination, which is one of the advantages of mesh connected networks. The routing engine 430 selects just one of the output links specified by the routing mask for routing the packet.

Figure 4:
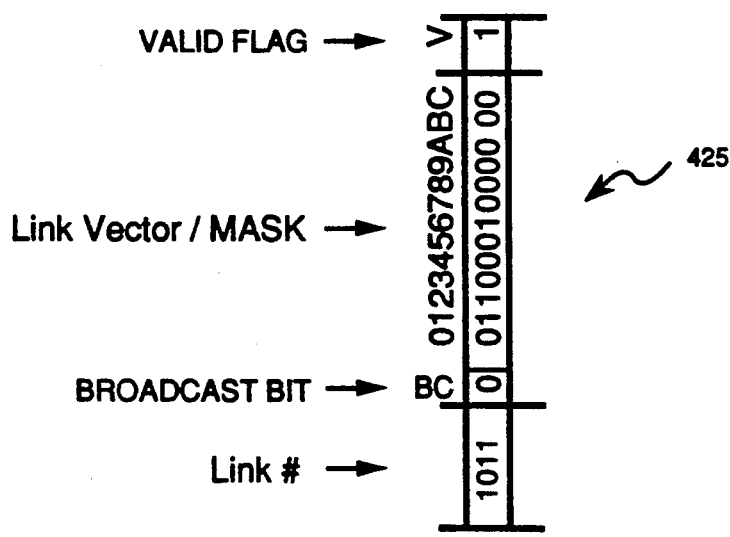
FIG. 4 depicts the data representing a routing request.

FIG. 4 shows the exact format of a routing request 425 as it is input into the routing engine 430. The top bit, called the valid flag is set to "1" whenever a routing request is loaded into the routing engine 430, and is reset to "0" when there is no new routing request to load into the routing engine 430. The next fourteen bits are the routing mask and broadcast bit output by the routing table 422, as discussed above. The last four bits are the input link number for the packet being routed.

Routing engine 430 compares a link availability mask, which represents the currently available output links, With routing requests. More particularly, the purpose of the routine engine 430 is to match the output link needs of each new packet with the available output links of the switch. The routing selection value generated by the routing engine 430 is used by the crossbar 212 (shown in FIG. 2) to set up its multiplexers and thereby connect a specified input link to one or more specified output links.

As described with respect to FIG. 2, each output link unit 222 transmits a "link available" signal which indicates whether that output link is available for routing, or is already either in use or blocked. Bus 232 carries the link available signal lines from all the output links. The routing engine 218 periodically samples the link available signals on bus 232 and stores them internally (in column 465 shown in FIG. 5). The routing engine 430 uses the available link mask when making routing selections.

When the routing engine 430 is able to match a routing request with one or more available links, it generates a routing selection value which it outputs on bus 232. The routing selection value consists of the four bit input link number, the broadcast bit and the valid bit from the satisfied routing request, and an output link mask which identifies the output link or links that are to be coupled to the input link. The input link number, the broadcast bit and the valid bit are transmitted on the portion of the router bus labelled 232B, and the output link mask is transmitted on the portion of the router bus labelled 232A. The route selection values transmitted on router bus 232 are used by the input and output link units 220 and 222, and crossbar 212 (shown in FIG. 9) to connect a specified input link to one or more specified output links.

The "valid" output bit is ON only in cycles during which the routing engine 430 outputs a new route selection. Thus the "valid" bit output by the routing engine 430 is OFF in cycles during which the routing engine 430 is unable to match any of the pending routing requests with the available output links.

Control circuit 435 generates clock signals for the routing engine 430 and request selection circuit 424. These clock signals also control the use of the packet address bus 230 and the router bus 232. That timing protocol will be described below with reference to FIG. 6.

Routing Engine

Figure 5:
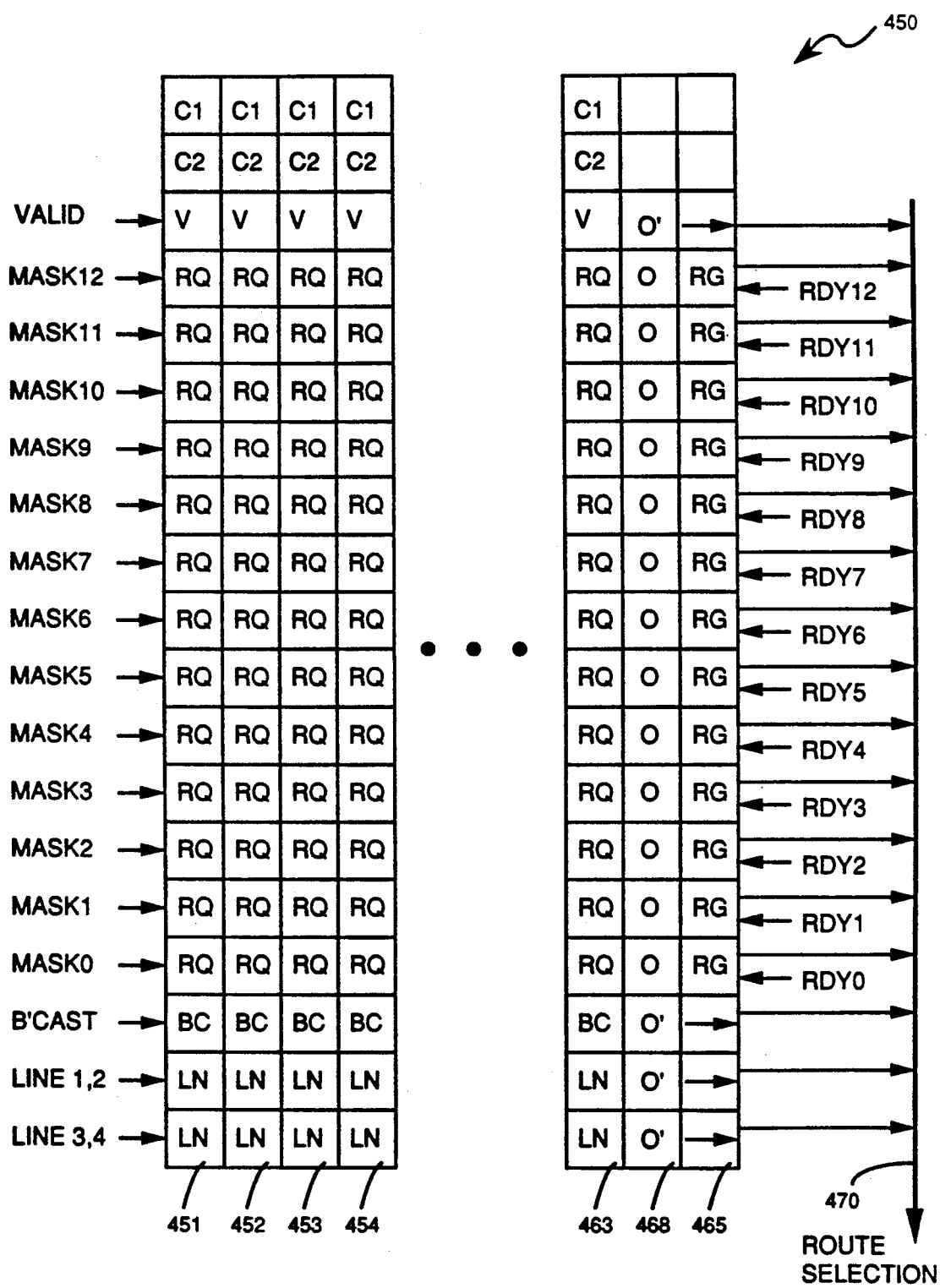
FIG. 5 is a block diagram of the preferred embodiment of the routing engine for making packet routing selections.

FIG. 5 shows a preferred embodiment of the routing engine 430. In this embodiment, the routing engine is formed from an array 450 of computational components, each of which is represented by a box in FIG. 5. The array shown represents a programmable gate array called the Xilinx 3090 array, made by Xilinx Corp. The Xilinx 3090 contains sixteen columns with twenty combinational logic blocks (CLBs) in each column. The CLBs can be electrically programmed to perform a variety of logic and storage functions. Each CLB contains two flip-flops and two function units. Each function unit is capable of calculating any boolean function of up to four input variables. The CLB produces two outputs, which can come directly from the function blocks or from the flip flops. There are also two tri-state drivers near each CLB. These drivers can be connected to horizontal metal traces that cross the chip, allowing the construction of busses. In addition to providing programmable logic, the Xilinx 3090 array provides programmable interconnections between neighboring CLBs, as well as a number of pad cells which provide an interface to circuits outside the array. Thus, the behavior and function of the array is determined by a pattern of control bits which is loaded into the array from an external source (e.g., the SCP in each switch). No customization is done as part of chip manufacturing.

The routing engine array 450 uses thirteen columns 451–463, each with nineteen logic blocks. Each of these columns 451–463 stores and processes a single routing request. In addition, on the right side of the chip there is a column 465 of thirteen ready signal generators (RG) and a column 468 of seventeen output signal generators (O and O'). Each of the logic blocks in the array will be described in detail below.

First, however, it will be helpful to consider the overall method of operation of the array 450 shown in FIG. 5. Routing requests are received on the left side of the array. The signal symbols shown of the left side of the array match the format of the routing request shown in FIG. 4.

An output link availability mask, represented by signals RDY0 through RDY12, is received on the right side of the array 450.

Outputs from the array 450, which are the routing selections made by the routing engine, emerge on output bus 470 from the right side of the array. As described above with reference to FIG. 3, the routing selection contains nineteen eighteen bits: a valid bit, indicating a routing selection has been made, a thirteen bit output mask, and the broadcast bit and the four bit input link number from the routing request.

The thirteen columns 451–463 of the array act as a queue which implements the first come, first considered routing discipline of the present invention. The columns at the right side of the queue hold the oldest unsatisfied routing requests, while those on the left hold more recent requests.

The entire array works on a periodic clock cycle. The routing engine accepts one routing request during each period of six clock cycles and makes one attempt to make a routing selection during this six clock cycle period.

Figure 6:
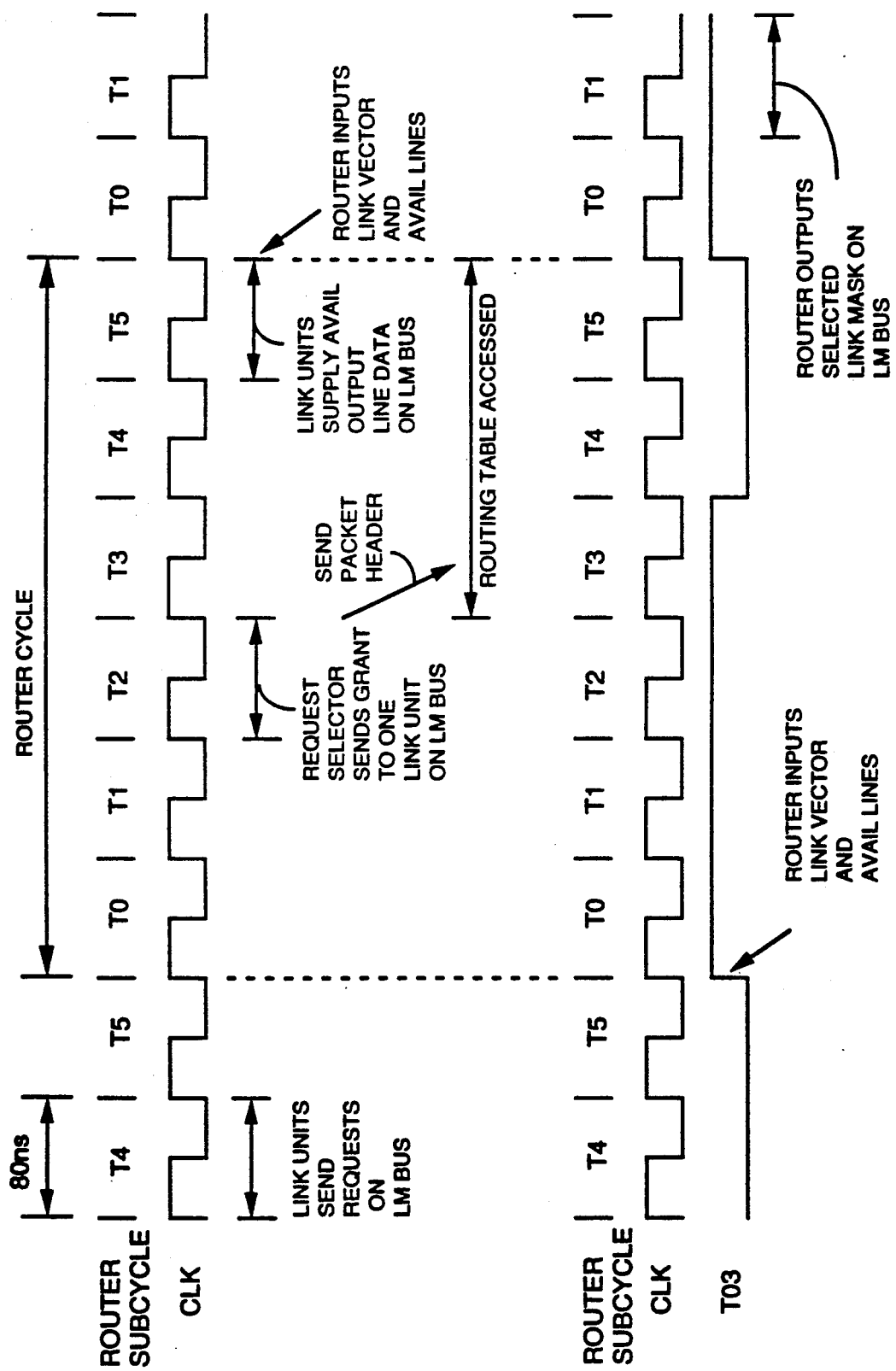
FIG. 6 is a timing diagram for FIGS. 5 and 7-13.

Referring to FIG. 6, each routing engine cycle has six phases labelled T0 through T5. Each phase lasts 80 nanoseconds, for a total routing engine cycle of 480 nanoseconds. The routing engine cycle has two major subphases represented by clock signal T03. During the first subphase T03=1 and during the second subphase T03=0.

As will now be described, it takes three routing engine cycles to send a routing request to the router 218, to process the request, and then to send a routing selection to the link units and crossbar.

Routing requests are sent to the router 218 as follows. During T4, each input link unit which has a routing request that needs to be sent to the router asserts a ON signal on its corresponding line of router bus 232. The routing selection circuit 424 monitors the router bus 232 during T4 to see if any routing requests are being asserted. If only one request is asserted, it is acknowledged. If more than one routing request is asserted during any one routing engine cycle, the routing selection circuit 424 selects just one of the requests, as was described above.

The selected request is acknowledged by sending an ON signal on bus 232 to the selected link unit during T2 of the next routing engine cycle. This acknowledgment signal instructs the signaled link unit that it has been selected to transmit its routing request over bus 230. During clock phases T3 through T5 the selected input link unit sends the packet address for its routing request to the routing table 422 via buffer 420. The routing table 422 is accessed and the link vector corresponding to the routing request is ready at its output by the end of T5.

During phase T5 all the output link units assert their availability flag values on the router bus 232 so that these signals will be ready for the routing engine at the beginning of the next routing engine cycle.

At the beginning of T0, the routing engine 430 latches in the link availability flags from router bus 232 and the current routing request, if any. The current routing request comprises the link vector output by the routing table 422, and the link number and valid bit output by the request selection circuit 424.

During the rest of the routing engine cycle, T0 through T5, the routing engine 430 compares the latched link availability data with all the unsatisfied routing requests stored in the data columns of the routing engine 430. The result of that comparison is latched in the output column 468 of the routing engine at the end of T5. However, the routing selection generated by the routing engine is not asserted on the router bus 232 until T1 of the following routing engine cycle. During T1 through T5 of this router cycle, if the Valid bit of the routing selection is ON, the link units and crossbar process the routing selection output so as to couple the specified input link unit with the specified output link unit(s).

In summary, each portion of the router 218 performs a distinct task during each routing engine cycle. In addition, the router bus 232 is time multiplexed for sending routing requests to the routing request selector 424 and for sending routing selections to the link units.

Used in a three stage pipeline with six 80 ns clock cycles per stage, the router 218 can route slightly more than two million packets per second, and adds a latency of about 1.44 microseconds per switch in the path of each packet. The three stages of the router pipeline are (1) input link selection and routing table lookup to generate a routing request mask, (2) the routing engine cycle, and (3) transmission of routing selections to the crossbar 212 and the link units.

The following is a more detailed description of the operation of the routing engine during each phase of the routing engine cycle. At the beginning of each routing engine cycle, at the beginning of T0, a routing request and the available output link mask are read in. The routing request is latched into the leftmost column of the array 451, and the link availability mask (RDY0 to RDY12) is latched into the ready signal column 465. In addition, each unsatisfied routing request which is already stored in the array is shifted one column to the right in the array if there is at least one column to its right in the array which is not occupied by an unsatisfied request.

During the first subphase of the routing engine cycle several sets of signals propagate across the array. First, the link availability mask propagates across the array from right to left. The circuitry in each of the request handling columns 451–463 compares the routing request stored in that column with the link availability mask. In those columns which store non-broadcast requests (with BC=0) a MATCH signal is generated if at least one enabled MASK bit matches an enabled RDY bit. In particular, each available link, denoted by a value of RDY=1, is compared with the corresponding bit of the routing masks that are stored in the array 450. When the RDY signal for an available link encounters a routing request that has the corresponding bit of its routing mask ON, a MATCH signal for the column is generated.

In those columns which store broadcast requests (with BC=1), a MATCH signal is generated only if all of the enabled MASK bits match the corresponding RDY bits (i.e., only if all output links needed by the request are available).

Columns which store broadcast requests (with BC=1) also block the propagation of those RDY signals which match the MASK bits of the broadcast request. In effect, broadcast requests "reserve" the available output links needed by that request. If this were not done, the routing of a broadcast packet could be permanently blocked by subsequent requests which match and use individual ones of the output links needed by the broadcast packet.

The MATCH signals are propagated upwards through those columns where a match is found. Thus the MATCH signals are the second set of signals which propagate during the first subphase of the routing engine cycle.

It is quite possible for two or more columns to generate MATCH signals. Therefore, in order to give highest priority to the oldest requests, it is necessary to select the rightmost column in which a match was found. To do this a signal called ANSWERED propagates through the C1 cells at the top of the array from the right side of the array to the left. The ANSWERED signal has a value of "0" until it encounters a valid column (i.e., VALID="1") with an enabled MATCH signal, at which point ANSWERED is given a value of "1".

The ANSWERED signal is the third type of signal which propagates during the first subphase of the routing engine cycle.

During T4 and T5, an output enable signal ND_ENABLE is generated for the rightmost column with an enabled MATCH signal that receives an ANSWERED signal of "0" from its right-hand neighbor. Of course, during many routing engine cycles none of the columns will match the available link mask, and no output enable signal will be generated. For the moment, consider the case in which an output enable signal is generated for one selected column.

Only one column, at most, will have an enabled ND_ENABLE signal during any one routing engine cycle. If none of the columns have an enabled ND_ENABLE signal, that means that the routing engine failed to find any routing requests which matched the available output links.

During T4 and T5 all the matched routing mask bits (i.e., enabled mask bits for which there is an available output link), as well as the broadcast bit, link number bits and the valid bit of the selected column are propagated to the right to the output processing column 468. Assuming that the broadcast bit is OFF, only the lowest enabled mask bit in the array is output, and all the other mask bits are disabled.

The resulting routing selection value will have an enabled valid bit, one enabled mask bit (unless it is a broadcast packet), and the broadcast bit and input link number of the routing request.

It will be clear to those who consider the matter that some packets will not be routed immediately because the output link or links that a packet needs may be busy. Therefore columns 451-463 of the routing engine array 450 act as a queue in which unsatisfied routing requests are stored and periodically compared with the available output links.

When the routing engine fails to match the available output links with any pending routing requests, the data output by the array has a disabled VALID bit. The link units and crossbar circuit in the switch ignore outputs of the routing engine during cycles in which the VALID bit is disabled.

The following are detailed explanations of how each of the logic blocks in the array of FIG. 5 works.

LOGIC BLOCK: RQ

Figure 7:
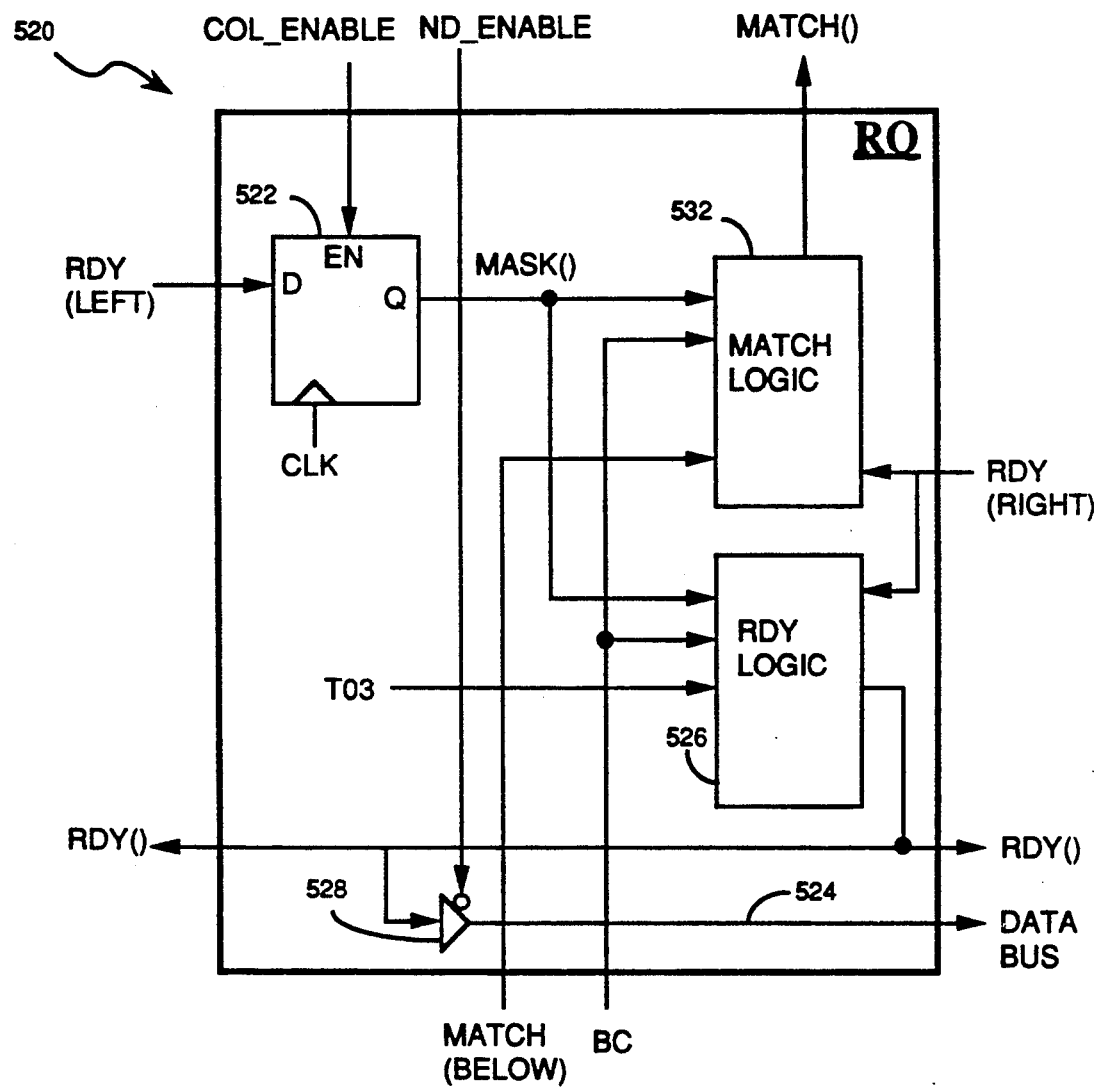
FIG. 7 is a block diagram of a circuit cell for matching one portion of a routing request with link availability data.

FIG. 7 shows the combinational logic block (CLB) 520 denoted as RQ in FIG. 5. In order to understand how any of the circuit blocks work, one must first consider where the input signals for each block come from and how the outputs of each circuit block are transmitted.

The input lines of each logic block can be coupled to signal lines in each of the block's four closest neighbors: the CLBs above and below, and the CLBs to the left and right. For example, in FIG. 7 the data input for flip-flop 522 is obtained from the RDY signal in the cell to the left of the current cell, denoted RDY(LEFT).

It is important to note that in an array of identical CLBs, the output of one cell will be the input of a neighboring cell, and therefore the same signal names will appear in each cell as both an input signal and an output signal. To denote which signal is which, signals derived from neighboring cells contain an identifier of the source in parentheses, such as "(RIGHT)", "(LEFT)" or "(BELOW)". Signals generated by the CLB being viewed are denoted with an empty pair of parentheses "()".

In addition, there are two horizontal data buses which pass over each row of CLBs. The data buses are used to transmit signals to the output cells in column 468 (shown in FIG. 5). The data lines are labeled "DATA" when only one of the data lines for a CLB is used, or "DATA1" and "DATA2" when both are used. In FIG. 7, the RQ cell 520 uses only one DATA bus line 524. The DATA bus line is coupled to the RDY() output of logic circuit 526 by a tri-state buffer 528. As will be explained in more detail below, the RDY() signal is transmitted on the DATA bus only if the route selection signal ND_ENABLE is enabled. ND_ENABLE is a negative logic signal which has a value of "0" when enabled.

The details of the operation of circuit block 520 are as follows. The RDY(LEFT) signal from the cell to the left of this circuit 520 is latched into flip-flop 522 at the end of T5 if COL_ENABLE is enabled (i.e., equal to "1"). As will be seen, RDY(LEFT) is equal to the routing mask bit stored in the column to the left of column in which circuit 520 is located. If circuit block 520 is in the first column 451, RDY(LEFT) is equal to one of the MASKx signals from the routing request that is being read. For that reason, the output line 530 of the flip-flop 522 is labelled MASK().

The boolean equation for match logic circuit 532 is:

MATCH()=BC * MATCH(BELOW) *
(~MASK()+RDY(RIGHT)) + ~BC *
(MATCH(BELOW)+MASK() * RDY(RIGHT))

where "*" means the boolean AND function, "+" means the boolean OR function, and "~" means the boolean NOT function. The above equation means that an enabled MATCH() signal is output if (1) the request stored in this column is for a broadcast packet, and a MATCH signal was generated by the neighboring cell below, and either the mask bit MASK() is OFF or the available output link signal RDY(RIGHT) is ON, or (2) the request is for a non-broadcast packet, and either a MATCH signal was generated by the neighboring cell below or both the mask bit MASK() is ON and the available output link signal RDY(RIGHT) is ON (i.e., a RDY bit matches a MASK bit).

A MATCH signal propagates up each column to the control logic cells C1 and C2. The match conditions are different for broadcast and non-broadcast requests. For non-broadcast requests, a match in any bit is sufficient for the column to generate an enabled MATCH() signal. For a broadcast request, all cells 520 with enabled true MASK() bits must match the incoming RDY(RIGHT) bits for the request to be satisfied and an enabled MATCH() signal to be generated.

For the RQ cells at the tops of the columns in the array 450 of FIG. 5, the signal name given to the MATCH output signal is FULLMATCH rather than MATCH. For the RQ cells at the bottom of each column in the array, which has no match input from below, the boolean equation of the MATCH logic circuit is:

MATCH(BOTTOM CELL)=BC *
(~MASK()+RDY(RIGHT)) + ~BC * MASK()
* RDY(RIGHT)

Thus for the RQ cells at the bottom of each column, a MATCH signal is generated for non-broadcast requests if the routing mask bit MASK() matches an available line RDY(RIGHT), or for a broadcast request if either the routing mask bit MASK() is not ON or the corresponding RDY bit in ON (i.e., the output link corresponding to RDY(RIGHT) is available).

The boolean equation for RDY logic circuit 526 is:

RDY()=T03 * RDY(RIGHT) *~(BC * MASK())
+ ~T03 * MASK()

What this equation means is that during the first subphase of each routing engine cycle, when T03=1, RDY() is equal to the RDY signal from the right hand cell, unless a broadcast request is being processed and the mask bit for this cell is ON. In other words, during the first clock subphase, the RDY signal is allowed to propagate from the right side of the array to the left, except that broadcast requests inhibit the propagation of RDY in rows in which the request mask bit is ON.

During the second subphase of each routing engine cycle, when T03=0, RDY() is equal to the mask bit MASK(). Thus, during the second clock subphase the RDY() signal is used to propagate the request mask bit one cell to the right.

The operation of the RQ logic block 520 will be clearer after the operation of the other logic blocks is explained.

LATCH BLOCKS: LN, BC, V

Figure 8:
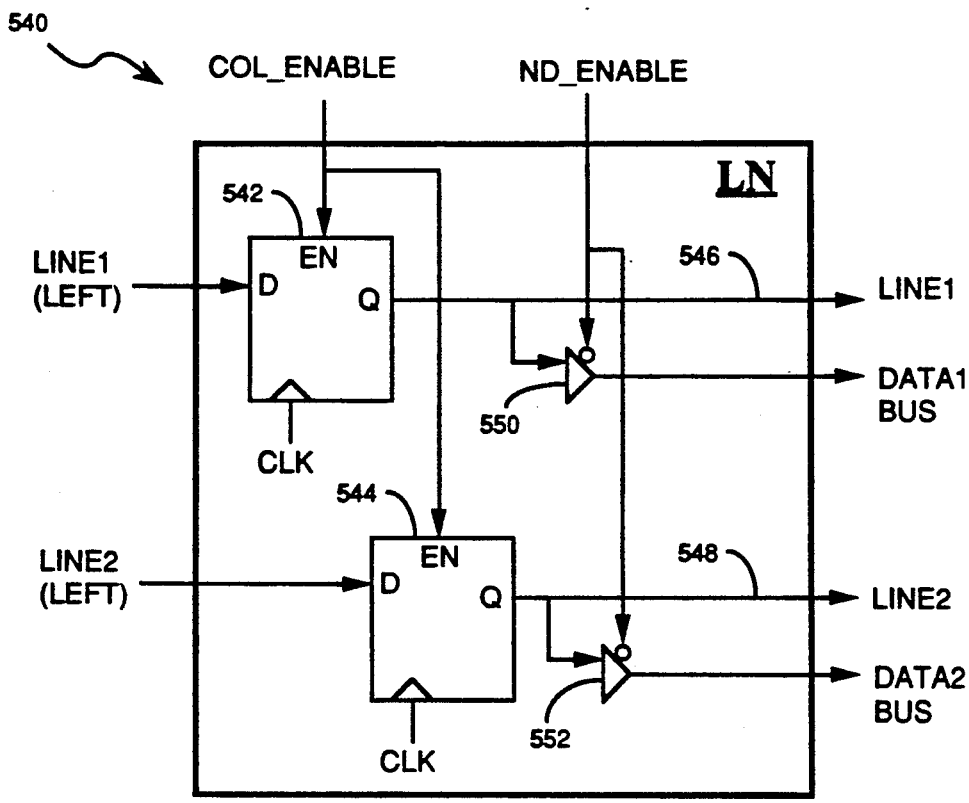
FIGS. 8-10 are block diagrams of latch circuits used to store and shift an input link number, a valid bit, and a broadcast bit, respectively.

Referring to FIG. 8, logic block 540 corresponds to the blocks labelled "LN" in FIG. 5. This circuit is used to store two of the four bits which make up the input link number associated with a routing request. The two bit values are received on the lines labelled LINE1(LEFT) and LINE2(LEFT) from the next column to the left, or from the request selection circuit 424 (see FIG. 3) for the left hand column 451. If COL_ENABLE for the column is ON, the bit values on LINE1(LEFT) and LINE2(LEFT) are latched into two flip flops 542 and 544 at the end of T5.

If ND_ENABLE is enabled (i.e., set to "0") at the end of the first clock subphase (i.e., at the end of T03), the signals on the flip-flop output lines 546 and 548 are coupled to data buses DATA1 and DATA2 by tri-state buffers 550 and 552. In other words, the input link number is transmitted to the output column 468.

Figure 9:
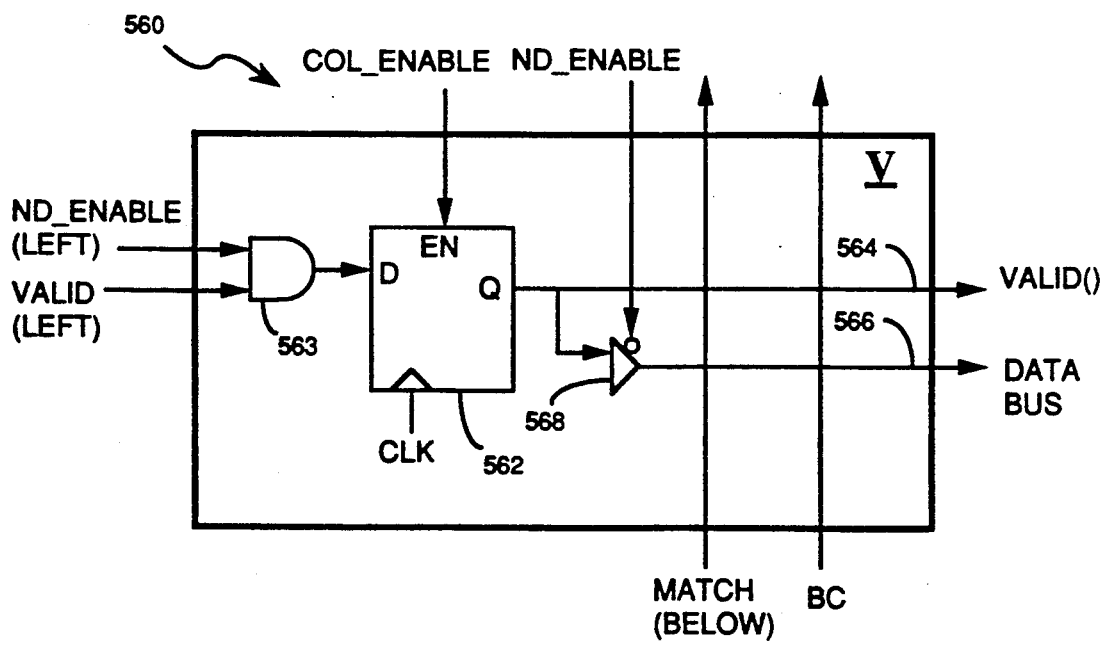

Referring to FIG. 9, logic block 560 corresponds to the blocks labelled "V" in FIG. 5. This circuit is used to store the VALID bit associated with a routing request. Only columns containing pending routing requests have enabled VALID bits. The VALID bit is received on the line labelled VALID(LEFT) from the next column to the left. For the circuit 560 in the left hand column 451 of the routing engine, the VALID(LEFT) input comes from the request selection circuit 424 (see FIG. 3).

If COL_ENABLE for the column is ON, the value of VALID(LEFT) when logically ANDed with ND_ENABLE(LEFT) is latched into flip flop 562 at the beginning of T0. The purpose of the AND gate 563 is as follows. The ND_ENABLE signal in each column is usually equal to "1", thereby allowing the VALID(LEFT) signal to pass through the AND gate 563 unchanged. ND_ENABLE, however, is set equal to "0" when a routing request in a column is selected (or output. To ensure that such a request does not supply a result in a subsequent cycle, the inputs of the shift registers for BC and VALID are ANDed with ND_ENABLE(LEFT). This means that if a column supplies a result and shifts in the same cycle, the request will be invalidated and its BC bit cleared when it shifts into the next column to the right.

For the circuit 560 in the left hand column 451, the VALID bit from the routing request selector 424 is directly coupled to the input of flip-flop 562.

If ND_ENABLE is enabled (i.e., set to "0") at the end of the first clock subphase (i.e., at the end of T03) the signal on the flip-flop output line 564 is transmitted onto to data bus 566 by tri-state buffer 568.

Figure 10:
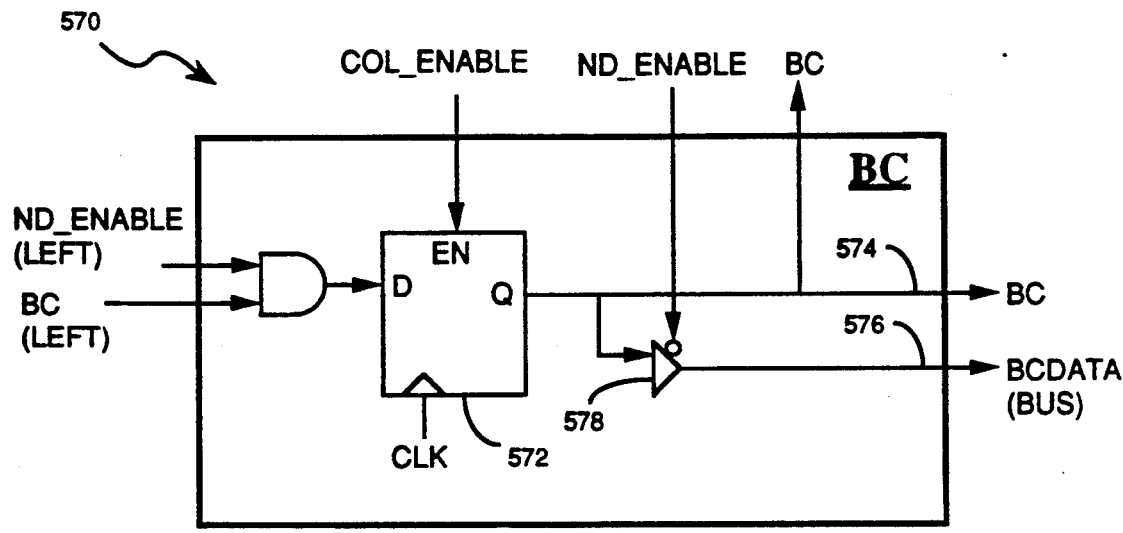

Referring to FIG. 10, logic block 570 corresponds to the blocks labelled "BC" in FIG. 5. This circuit is used to store the broadcast bit associated with a routing request. BC is equal to "1" for broadcast requests and "0" for non-broadcast requests The BC bit is received on the line labelled BC(LEFT) from the next column to the left. For the circuit 570 in the left hand column 451 of the routing engine, the BC(LEFT) input comes from the routing table 422 (see FIG. 3).

If COL_ENABLE for the column is ON, the bit value of BC(LEFT) is logically ANDED with ND_ENABLE(LEFT) and is then latched into flip flop 572 at the beginning of T0. As a result, if COL_ENABLE is ON and the data in the column from the left is being shifted to the right, and that routing request in that column was selected for output, the BC bit in that request will be turned OFF as it is stored in flip-flop 572. It is important to turn OFF the BC bit in invalid requests because an enabled BC bit will stop RDY signals from propagating across any row in which a mask bit in the request is ON. However, when the BC bit is OFF, the RDY signals are not stopped by ON mask bits.

For the circuit 570 in the left hand column 451, the BC bit from the routing table 422 is directly coupled to the input of flip-flop 572.

The broadcast bit BC is transmitted both to the next column over to the right, and upwards through the column in which it is stored. As shown in FIG. 7, each of the RQ logic blocks 520 above the BC circuit 570 uses the BC bit as one of the inputs to its MATCH and RDY circuits 532 and 526.

If ND_ENABLE is enabled (i.e., set to "0") at the end of the first clock subphase (i.e., at the end of T03), the signal on the flip-flop output line 574 is transmitted onto to the BCDATA bus 576 by tri-state buffer 578.

LOGIC BLOCK: C1

The logic control circuits C1 and C2 at the top of each column make two decisions at the end of the first subphase (i.e., at the end of T03) of each routing engine cycle: (1) whether the request contained in the column was satisfied, and (2) whether to load the column with the data from the column to the left (or from the routing table 422 for the first column 451). If a request is satisfied and selected for output, as indicated by an enabled ND_ENABLE signal, the column's mask is sent on the horizontal data buses to the output stage (column 468 in FIG. 5) of the routing engine.

Figure 11:
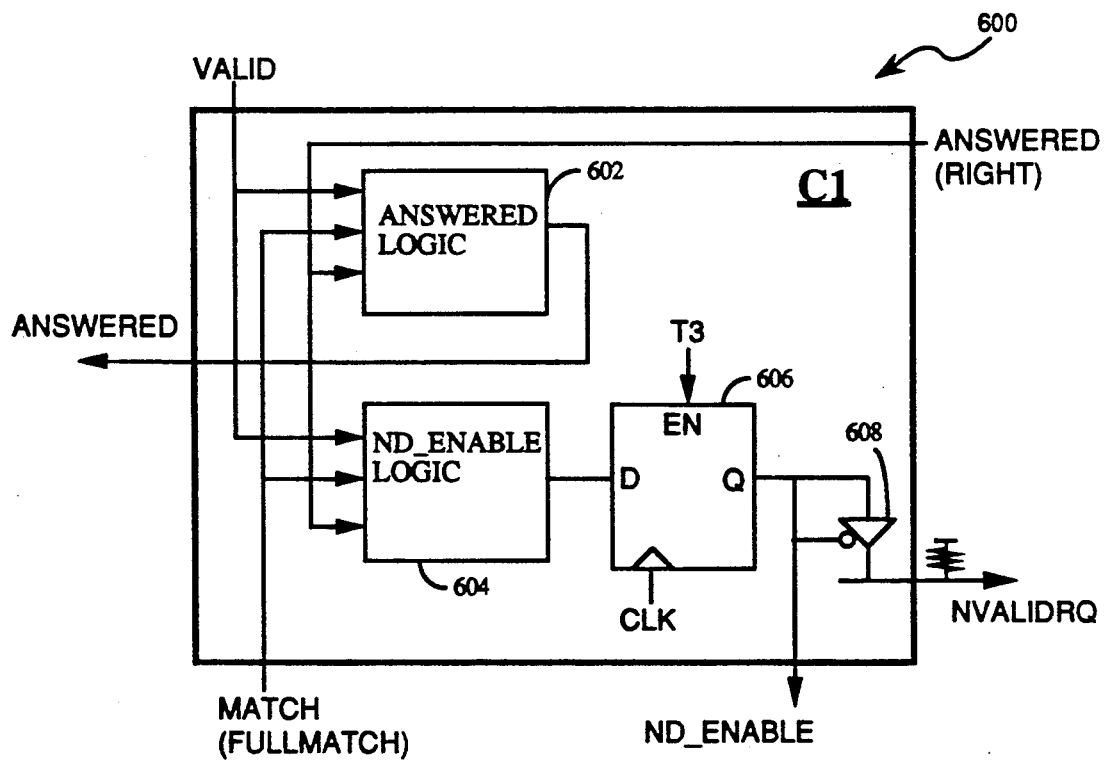
FIGS. 11 and 12 are a block diagrams of two logic circuits for determining if a routing selection can be made for a particular bus request.

Referring to FIG. 11, logic block 600 corresponds to the blocks labelled "C1" in FIG. 5. This circuit is used to determine whether the column containing this circuit 600 contains a satisfied request, and whether this column's mask should be transmitted by the data buses to the output stage. A column supplies its mask to the data buses if it is valid, if its contents match the RDY lines, and if no column to the right has already supplied its mask to the data buses. The column which supplies its mask to the output stage represents a satisfied routing request which will be removed from the routing queue.

The boolean equation for ANSWERED logic circuit 602 is:

ANSWERED()=ANSWERED(RIGHT)+- VALID() * FULLMATCH

The signal ANSWERED() is propagated from right to left through the C1 cells to indicate that a column to the right will supply a route selection during the current routing engine cycle. If the ANSWERED(RIGHT) signal received is ON, the ANSWERED logic circuit 602 automatically replicates that signal. If the ANSWERED(RIGHT) signal received is not ON, ANSWERED() is set ON only if the column contains a valid request and a FULLMATCH signal was generated by the RQ cells of the column.

The boolean equation for the ND_ENABLE logic circuit 604 is:

ND_ENABLE:=~(VALID() * FULLMATCH * ANSWERED(RIGHT))

where the ":=" operation indicates that the term is latched in a flip flop 606 at the end of T3.

The above equation means the ND_ENABLE is low (i.e., enabled) for valid requests which matched the RDY link available signals, but only if the ANSWERED(RIGHT) signal from the column to the right is OFF. When ND_ENABLE is low, it enables all the tri-state buffers shown in FIGS. 7 through 10 so that the routing request in this column will be transmitted via the horizontal data buses to the output circuits in column 468.

The signal NVALIDRQ is asserted low by tristate driver 608 whenever any column in the array produces ND_ENABLE. NVALIDRQ is pulled high by a pull up resistor when none of the columns in the array produces NE_ENABLE. The NVALIDRQ signal is used by the logic that generates the final output of the routing engine, as will be described later.

LOGIC BLOCK: C2

Figure 12:
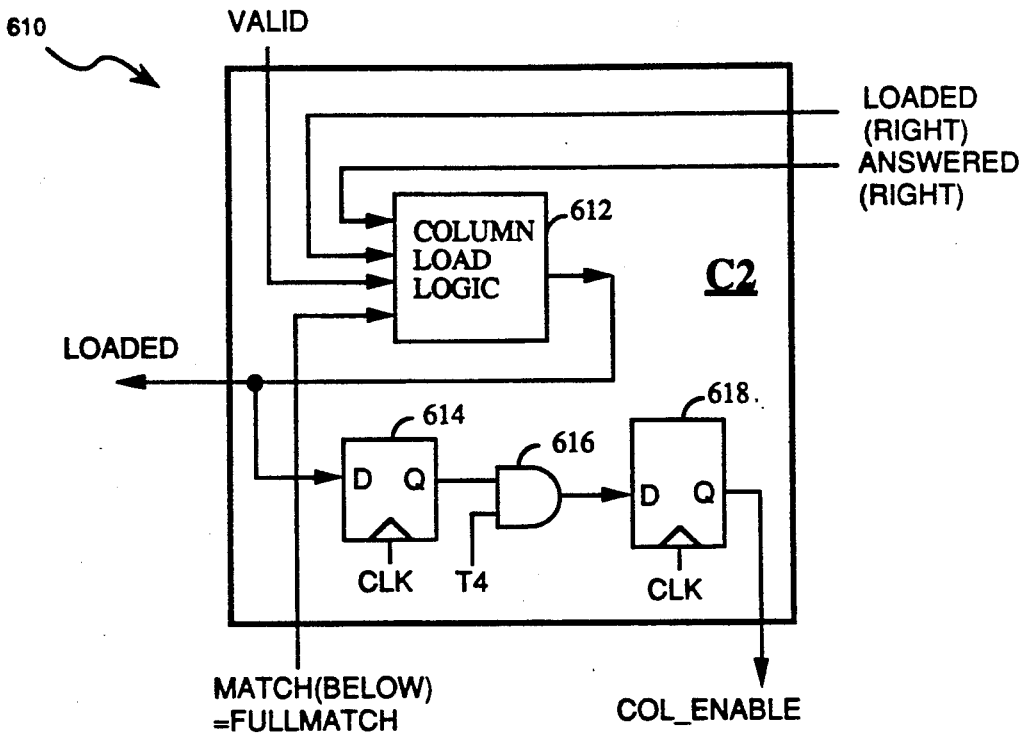

Referring to FIG. 12, logic block 610 corresponds to the blocks labelled "C2" in FIG. 5. This circuit is used to determine whether the column containing this circuit 610 will be loaded with the data from the column to the left.

The boolean equation for the COL_ENABLE logic circuit 612 is:

LOADED()=~VALID+LOADED(RIGHT)
+~ANSWERED(RIGHT) * FULLMATCH

The LOADED() signal is stored in flip-flop 614, the output of which is ANDED with clock signal T4 by AND gate 616 and then stored in flip-flop 618. The output of flip-flop 618 is the column enable signal, COL_ENABLE, which is equal to LOADED() only during T5. Since COL_ENABLE is enabled only during clock phase T5, data is loaded in from the column to the left at the end of T5, which is at the end of the current routing engine cycle and at the beginning of the next routing engine cycle.

As new requests are entered into the array 450, columns containing unsatisfied or invalid requests must shift to the right to make room for the new routing requests. The signal LOADED is propagated from right to left through the C2 control section of the array 450 to control column loading. The general idea is that all the columns will be shifted to the right during each cycle, except for columns at the right side of the array which hold unsatisfied requests.

More specifically, each column loads in the data from the column to its left (and the leftmost column loads from the routing table 422) if certain conditions are met:

(1) ~VALID: if the column contains an invalid request, the column will be overwritten with the data from the column to the left, or (2) LOADED(RIGHT): some column to the right will load data from the column to its left, or (3) ~ANSWERED(RIGHT) * FULLMATCH: the routing request in the column has been satisfied and selected for output.

If a column supplies the result and no column to its right shifts, the request will be overwritten by the contents of the column to its left. If, on the other hand, the array contains an invalid request to the right of a column that supplies a result, then the already-satisfied request will shift right by one column and will remain in the array.

To ensure that such a request does not supply a result in a subsequent cycle, the inputs of the shift registers for BC and VALID are ANDED with ND_ENABLE(LEFT), as shown in FIGS. 9 and 10. This means that if a column supplies a result and shifts in the same cycle, the request will be invalidated and its BC bit cleared when it shifts into the next column to the right.

LOGIC BLOCKS: O, O' and RG

Figure 13:
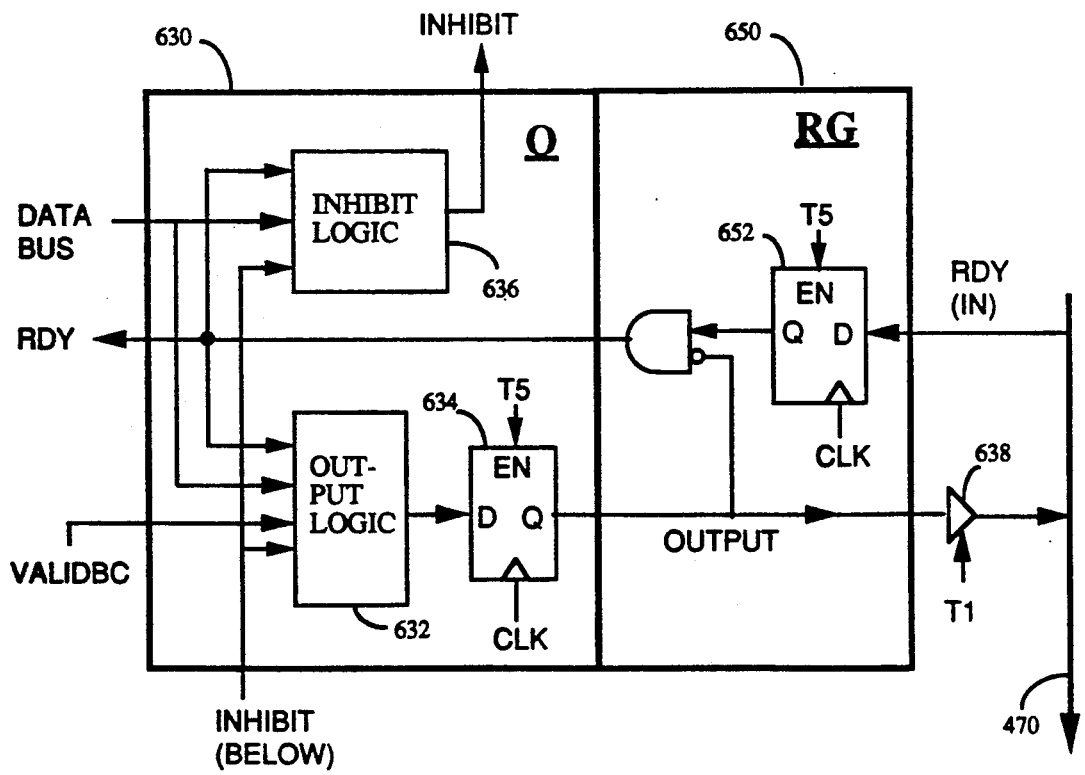
FIG. 13 is a block diagram of an output circuit.
Figure 14:
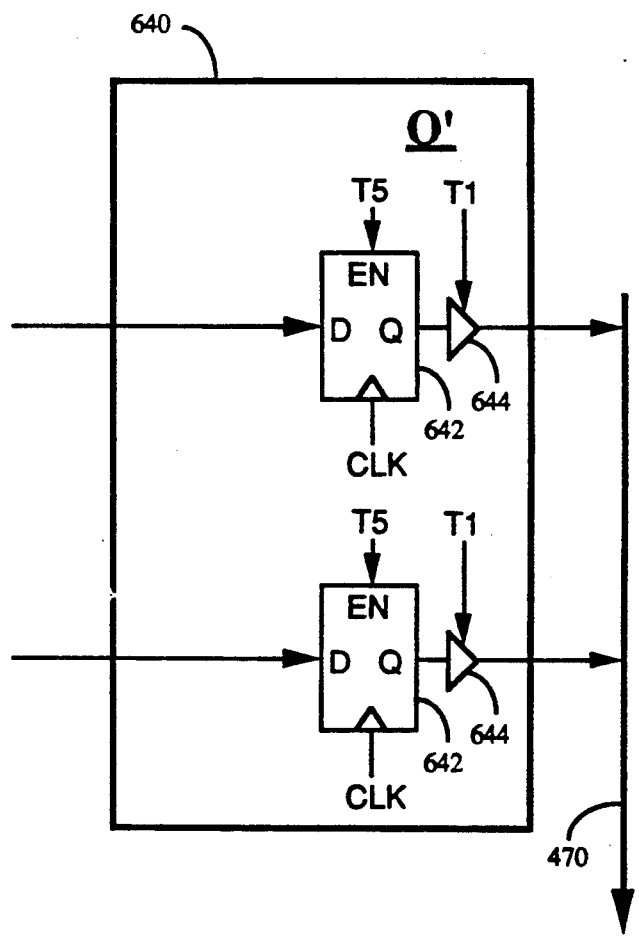
FIG. 14 is a block diagram of a second output circuit.

Referring to FIGS. 13 and 14, logic blocks 630 (O), 640 (O') and 650 (RG) at the right edge of the array produce the final outputs of the routing engine, and receive the RDY mask (i.e., link availability mask) from the output link units of the switch. Function block 630 in each row of the array generates the final output for that row. Function block 630 also generates an INHIBIT signal that propagates up the column of output function blocks from the first row that supplies the output designating a selected output link. The purpose of the INHIBIT signal is to ensure that only one mask bit is output in response to a non-broadcast request.

The signal VALIDBC is supplied to all output blocks 630. It indicates that a valid broadcast request is present at the output of the array. VALIDBC is generated by an AND gate (not shown), represented by the boolean equation:

VALIDBC=~NVALIDRQ * BCDATA

The boolean equation for the OUTPUT logic block 632 is:

OUTPUT:=(~INHIBIT(BELOW)+VALIDBC)
* RDY * DATA where the ":=" operation indicates that the output signal is latched in a flip flop 634 at the end of T5.

The boolean equation for the INHIBIT logic block 636 is:

INHIBIT=INHIBIT(BELOW)+RDY * DATA

When a column within the array supplies its mask as the result of a valid broadcast request, all the bits in the routing request are delivered to the output bus 470 since all of these bits match the bits in the RDY mask. Thus for valid broadcast requests, the INHIBIT signal is ignored by the output logic block 632.

For a non-broadcast request, the routing request mask (DATA) must be ANDED with the RDY mask, and only one of the resulting bits must be supplied as part of the final routing selection value. To achieve this, an INHIBIT signal is generated by the first row, starting from the bottom of the array, which has a routing mask bit that matches the RDY mask. All rows above the first row which generates an INHIBIT signal will be inhibited from generating an output.

To ensure that the routing engine does not incorrectly deliver an output when no column of the array produces a result, the signal NVALIDRQ, generated by block 600 (C1) is supplied as the INHIBIT(BELOW) signal to the first (bottom most) cell 630 of the output column. NVALIDR is high only if the array does not produce a result. This inhibit signal propogates up the column of output cells, inhibiting the generation of all outputs.

The final output is latched into flip-flop 634 at the end of each routing engine cycle (i.e., at the end of clock T5), and then asserted by output line driver 638 on the routing engine's output lines 470 during phase T1 of the following routing engine cycle.

Referring to FIG. 14, the output cells 640 (O') for the link number, the BCDATA signal, and the valid bit rows of the routing engine have a latch 642 and output line driver 644 for each of these signals. In the case of the valid bit row, the signal that is latched in latch 642 is the NVALIDRQ signal generated by tri-state driver 608 in block C1 (600). The final output in each of these rows is latched into a flip-flop 642 at the end of each routing engine cycle (i.e., at the end of clock T5), and then asserted by output line driver 644 on the routing engine's output lines 470 during T1 of the following routing engine cycle.

Referring to FIG. 13, the RDY signals (i.e., availability mask) supplied by the output link units cannot be used directly by the routing engine. This is because the router 218 is a pipelined circuit. If the routing engine 430 supplies an output that uses a particular output link, then that output link must be made to appear not ready (i.e., not available) for use during the following routing engine cycle. This is accomplished by ANDing the incoming RDY mask with the complement of the output mask before delivering it to the queue of routing requests in columns 451–463 of the routing engine.

The boolean equation for the RDY signal circuit 650 is:

RDY=RDY(LATCHED)*~OUT where RDY(LATCHED) is the RDY link availability value latched in flip flop 652 at the beginning of each routing engine cycle (i.e., at the beginning of T0).

ROUTING ENGINE PERFORMANCE

In the preferred embodiment, the longest combinational path for the first subphase of the routing engine's operation is about 270 nanoseconds. This means that the maximum amount of time it can take for the RDY signals to propagate across the array, for the MATCH signals to propagate up the array, for ANSWERED to propagate to the left across the array and for the COL_ENABLE and ND_ENABLE signals to be generated is about 270 nanoseconds.

The longest combination path for the second subphase is a maximum of 150 nanoseconds.

The preferred embodiment uses a conservative design which ensures that all signals have time to settle before results are latched. As a result, the first subphase uses four 80 ns clock cycles (T0 through T3) for a total of 320 ns, and the second phase uses two 80 ns clock cycles (T4 through T5) for a total of 160 ns. Thus the total clock cycle time of the routing engine is 480 ns. See the timing diagram of FIG. 6.

Alternate Embodiments

The Xilinx 3090 array used to implement the routing engine is a relatively expensive integrated circuit. It is presumed by the inventor that when the present invention is manufactured in quantity, the routing engine 430 will be implemented using a customized integrated circuit. It is estimated that a customized integrated circuit would bring down the cost of the routing engine by more than ninety per cent, ignoring the initial engineering costs for designing the custom circuit and for tooling (i.e., making the integrated circuit masks).

Other advantages of using a custom integrated circuit include higher operating speed, the ability to handle switches with more than twelve external link ports, and the ability to add additional features to the circuit. The Xilinx array uses relatively slow logic circuitry. While the routing engine is nevertheless able to make approximately two million routing selections per second, it is possible that even faster performance will be desirable when network transmission speeds increase beyond 100 million bits per second.

The Xilinx array used in the present embodiment has sixteen columns of twenty logical blocks. As a result it would be possible to add one more column and one more row to the array shown in FIG. 5 so as to enable the routing engine 430 to handle a switch with fourteen ports, including the port for the SCP. (The switches in the preferred embodiment have thirteen ports.) With a custom circuit it would be possible to further expand the array of logical elements so as to handle switches with a larger number of ports.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A resource allocating apparatus which allocates a multiplicity of shared system resources to received resource request, comprising:

request receiving means for receiving resource requests, each resource request including resource data denoting a subset of said multiplicity of shared system resources; wherein, in at least some of said received resource requests, said denoted subset comprises a plurality of shared system resources;

availability means for denoting a set of available resources, said set of available resources comprising the ones of said multiplicity of shared system resources which are available for allocation;

queue means coupled to said request receiving means for storing said resource requests received by said request receiving means, said stored resource requests being stored in the order in which said resource requests are received by said request receiving means;

selection means, coupled to queue means and said availability means, for comparing, in sequence, said resource requests stored in said queue means with said set of available resources, and for selecting the first one of said resource requests to match said set of available resources;

whereby available resources are allocated to resource requests on a first come, first considered basis.

2. The resource allocating apparatus of claim 1, each said resource request including type denoting means for denoting when said resource request is a broadcast request requiring use of all of a plurality of said shared system resources denoted by said resource request; said type denoting means also denoting when said resource request; said type denoting means also denoting when said resource request is a non-broadcast request requiring use of only one of said subset of said predefined set of shared system resources denoted by said resource request;

said selection means including resource reserving means for reserving said resources denoted by broadcast requests, said resource reserving means including means for preventing resource requests subsequent to a broadcast request from matching any of the resources denoted by said broadcast request.

3. The resource allocating apparatus of claim 2, said selection means including means for deleting a resource request from said queue means after said resource request has been selected by said selection means.

4. A method of allocating a multiplicity shared system resources to received resource requests, the steps of the method comprising:

receiving resource requests, each resource request including resource data denoting a subset of said multiplicity of shared system resources; wherein, in at least some of said received resource requests, said denoted subset comprises a plurality of said shared system resources;

denoting a set of available resources, said set comprising the ones of said multiplicity of shared system resources which are available for allocation;

storing received resource requests in the order in which said resource requests are received;

comparing, in sequence, said stored resource requests with said set of available resources, and selecting the first one of said stored resource requests to match said set of available resources;

whereby available resources are allocated to resource requests on a first come, first considered basis.

5. The resource allocating method of claim 4, each said resource request denoting whether said resource request is a broadcast request requiring use of all of a plurality of said shared system resources denoted by said resource request; said resource request also denoting whether said resource request is a non-broadcast request requiring use of only one of said subset of said multiplicity of shared system resources denoted by said resource request;

said comparing step including the step of reserving said resources denoted by broadcast requests and preventing resource requests subsequent to a broadcast request from matching any of the resources denoted by said broadcast request.

6. The resource allocating method of claim 5, said selecting step including the step of deleting a resource request from said stored resource requests after said resource request has been selected by said selecting step.

7. A routing apparatus for use in each of the switches of a mesh connected network, each switch having a multiplicity of input links for receiving data packets and a multiplicity of output links for transmitting data packets, said routing apparatus comprising:

request receiving means for receiving routing requests; each said routing request denoting a subset of said multiplicity of output links for transmitting a corresponding data packet; wherein, in at least some of said received routing requests, said denoted subset comprises a plurality of said output links;

availability means for denoting a set of said multiplicity of output links which are available for routing data packets;

queue means coupled to said request receiving means for storing said routing request received by said request receiving means, said stored routing requests being stored in the order in which said routing requests are received by said request receiving means;

selection means, coupled to queue means and said availability means, for comparing, in sequence, said routing requests with said set of available output links, and for selecting the first one of said routing requests to match said set of available output links;

whereby available output links are allocated to routing requests on a first come, first considered basis.

8. The routing apparatus of claim 7, each said routing request denoting whether said routing request is a broadcast request requiring use of all of a plurality of output links denoted by said routing request; said routing request also denoting whether said routing request is a non-broadcast request requiring use of only one of said subset of output links denoted by said routing request;

said selection means including resource reserving means for reserving said output links denoted by broadcast request, said resource reserving means including means for preventing routing requests subsequent to a broadcast request from matching any of the output links denoted by said broadcast request.

9. The routing apparatus of claim 8, said selection means including means for deleting a routing request from said queue means after said routing request has been selected by said selection means.

10. A method of routing data packets by each of the switches of a mesh connected network, each switch having a multiplicity of input links for receiving data packets and a multiplicity of output links for transmitting data packets, the steps of the method comprising:

receiving routing requests, each said routing request denoting a subset of said multiplicity of output links for transmitting a corresponding data packet; wherein, in at least some of said received routing requests, said denoted subset comprises a plurality of said output links;

determining which of said multiplicity of output links which are available for routing data packets;

storing received routing requests in the order in which said resource requests are received;

comparing, in sequence, said routing requests with said output links determined to be available, and selecting the first one of said stored routing requests to match one of said available output links;

whereby available output links are allocated to routing requests on a first come, first considered basis.

11. The routing method of claim 10, each said routing request denoting whether said routing request is a broadcast request requiring use of all of a plurality of output links denoted by said routing request; said routing request also denoting whether said routing request is a non-broadcast request requiring use of only one of said set of output links denoted by said routing request;

said comparing step including the step of reserving said output links denoted by broadcast requests, thereby preventing routing requests subsequent to a broadcast request from matching any of the output links denoted by said broadcast request.

12. The routing method of claim 10, said selecting step including the step of deleting a routing request from said stored routing requests after said routing request has been selected by said selecting step.

* * * * *

UNITED STATES PATENT AND TRADEMARK OFFICE
CERTIFICATE OF CORRECTION

PATENT NO.    : 5,179,558
DATED         : January 12, 1993
INVENTOR(S)   : Thacker et al.

It is certified that error appears in the above-identified patent and that said Letters Patent is hereby corrected as shown below:

Column 20,
Line 20, delete "request" and insert therefor -- requests --

Signed and Sealed this

Twenty-first Day of June, 2005

JON W. DUDAS
*Director of the United States Patent and Trademark Office*